United States Patent
Westerlund et al.

(10) Patent No.: US 12,500,933 B2
(45) Date of Patent: Dec. 16, 2025

(54) KEY REPLACEMENT DURING DATAGRAM TRANSPORT LAYER SECURITY (DTLS) CONNECTIONS OVER STREAM CONTROL TRANSMISSION PROTOCOL (SCTP)

(71) Applicant: Telefonaktiebolaget LM Ericsson (publ), Stockholm (SE)

(72) Inventors: Magnus Westerlund, Upplands Väsby (SE); John Mattsson, Täby (SE); Claudio Porfiri, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 70 days.

(21) Appl. No.: 18/703,040

(22) PCT Filed: Aug. 17, 2022

(86) PCT No.: PCT/IB2022/057712
§ 371 (c)(1),
(2) Date: Apr. 19, 2024

(87) PCT Pub. No.: WO2023/067400
PCT Pub. Date: Apr. 27, 2023

(65) Prior Publication Data
US 2024/0430242 A1    Dec. 26, 2024

Related U.S. Application Data
(60) Provisional application No. 63/270,064, filed on Oct. 21, 2021.

(51) Int. Cl.
*H04L 9/40*    (2022.01)
*H04L 9/32*    (2006.01)
(Continued)

(52) U.S. Cl.
CPC .......... *H04L 63/166* (2013.01); *H04L 9/3268* (2013.01); *H04L 63/0457* (2013.01); *H04L 65/65* (2022.05); *H04L 69/326* (2013.01)

(58) Field of Classification Search
CPC ..................................................... H04L 63/166
See application file for complete search history.

(56) References Cited

U.S. PATENT DOCUMENTS

| | | | |
|---|---|---|---|
| 11,722,561 B2 | 8/2023 | Westerlund et al. | |
| 2015/0372876 A1* | 12/2015 | Turon | H04L 63/205 370/254 |

(Continued)

FOREIGN PATENT DOCUMENTS

| | | |
|---|---|---|
| EP | 2552076 A2 | 1/2013 |
| EP | 4021069 A1 | 6/2022 |
| WO | 2023/067400 A1 | 4/2023 |

OTHER PUBLICATIONS

3GPP TS 33.501, "3rd Generation Partnership Project; Technical Specification Group Services and System Aspects; Security Architecture and Procedures for 5G System (Release 17)", V17.3.0, Sep. 2021, pp. 1-258.

(Continued)

*Primary Examiner* — Bradley W Holder
(74) *Attorney, Agent, or Firm* — NICHOLSON DE VOS WEBSTER & ELLIOTT LLP

(57) ABSTRACT

Embodiments include methods, electronic device, storage medium, and computer program to implement parallel Datagram Transport Layer Security (DTLS) connections over a stream control transmission protocol (SCTP) association. In one embodiment, a method at a first network node for encoding user messages for secure transmission to a second network node comprises: initiating a Datagram Transport Layer Security (DTLS) connection over a stream control transmission protocol (SCTP) association through a DTLS (Continued)

handshake using an existing Authenticated Chunks for SCTP (SCTP-AUTH) key from an existing DTLS connection over the SCTP association that transmits user messages: deriving a new SCTP-AUTH key from the initiated DTLS connection: transmitting further user messages through the initiated DTLS connection with the new SCTP-AUTH key: and closing the existing DTLS connection over the SCTP association upon confirmation that SCTP packets encrypted with the existing DTLS connection and SCTP packets authenticated by the existing SCTP-AUTH key have been delivered.

20 Claims, 4 Drawing Sheets

(51) Int. Cl.
    *H04L 65/65*     (2022.01)
    *H04L 69/326*     (2022.01)

(56) References Cited

U.S. PATENT DOCUMENTS

2017/0033889 A1* 2/2017 Ma .................. H04W 24/02
2018/0376516 A1* 12/2018 Bandlamudi ......... H04L 69/164
2019/0207776 A1* 7/2019 Wang ................. H04L 63/0428

OTHER PUBLICATIONS

3GPP TS 38.413, "3rd Generation Partnership Project; Technical Specification Group Radio Access Network; NG-RAN; NG Application Protocol (NGAP) (Release 16)", V16.6.0, Jul. 2021, pp. 1-473.

3GPP TS 38.423, "3rd Generation Partnership Project; Technical Specification Group Radio Access Network; NG-RAN; Xn Application Protocol (XnAP) (Release 16)", V16.6.0, Jul. 2021, pp. 1-464.

3GPP TS 38.463, "3rd Generation Partnership Project; Technical Specification Group Radio Access Network; NG-RAN; E1 Application Protocol (E1AP) (Release 16)", V16.6.0, Jul. 2021, pp. 1-239.

3GPP TS 38.473, "3rd Generation Partnership Project; Technical Specification Group Radio Access Network; NG-RAN; F1 Application Protocol (F1AP) (Release 16)", V16.6.0, Jul. 2021, pp. 1-466.

Anssi, "Recommendations for Securing Networks with IPsec", Technical Report, No. DAT-NT-003-EN, Aug. 3, 2015, 17 pages.

Barnes et al., "Confidentiality in the Face of Pervasive Surveillance: A Threat Model and Problem Statement", Internet Architecture Board (IAB), Request for Comments: 7624, Aug. 2015, pp. 1-24.

Belshe et al., "Hypertext Transfer Protocol Version 2 (HTTP/2)", Internet Engineering Task Force (IETF), Request for Comments: 7540, May 2015, pp. 1-96.

Bhargavan et al., "Transport Layer Security (TLS) Session Hash and Extended Master Secret Extension", Internet Engineering Task Force (IETF), Request for Comments: 7627, Sep. 2015, pp. 1-15.

Bhargavan et al., "Triple Handshakes and Cookie Cutters: Breaking and Fixing Authentication over TLS", 2014 IEEE Symposium on Security and Privacy, 2014, pp. 1-16.

Bradner, S., "Key Words for Use in RFCs to Indicate Requirement Levels", Network Working Group, Request for Comments: 2119, Mar. 1997, pp. 1-3.

Cooper et al., "Privacy Considerations for Internet Protocols", Internet Architecture Board (IAB), Request for Comments: 6973, Jul. 2013, pp. 1-36.

Dierks et al., "The Transport Layer Security (TLS) Protocol Version 1.2", Network Working Group, Request for Comments: 5246, Aug. 2008, pp. 1-104.

Farrell et al., "Pervasive Monitoring is an Attack", Internet Engineering Task Force (IETF), Request for Comments: 7258, May 2014, pp. 1-6.

Hohendorf et al., "Secure SCTP", Network Working Group, Internet Draft: draft-hohendorf-secure-sctp-33, Sep. 17, 2022, 39 pages.

Huang et al., "Dual Stack Hosts using the "Bump-In-the-Stack" Technique (BIS)—draft-huang-behave-rfc2767bis-02", Behave, Internet Draft, Obsoletes: 2767, Mar. 7, 2010, pp. 1-18.

IANA (Internet Assigned Numbers Authority), "Stream Control Transmission Protocol (SCTP) Parameters", Available Online at <https://www.iana.org/assignments/sctp-parameters/sctp-parameters.xhtml#sctp-parameters-27>, Nov. 7, 2022, 18 pages.

Jungmaier et al., "Transport Layer Security over Stream Control Transmission Protocol", Network Working Group, Request for Comments: 3436, Dec. 2002, pp. 1-9.

Leiba, B., "Ambiguity of Uppercase vs Lowercase in RFC 2119 Key Words", Internet Engineering Task Force (IETF), Request for Comments: 8174, May 2017, pp. 1-4.

Loughney et al., "Security Considerations for Signaling Transport (SIGTRAN) Protocols", Network Working Group, Request for Comments: 3788, Jun. 2004, pp. 1-13.

Moriarty et al., "Deprecating TLS 1.0 and TLS 1.1", Internet Engineering Task Force (IETF), Request for Comments: 8996, Mar. 2021, pp. 1-18.

Rescorla et al., "Connection Identifiers for DTLS 1.2—draft-ietf-tls-dtls-connection-id-13", TLS, Internet Draft, Updates 6347, Jun. 22, 2021, pp. 1-21.

Rescorla et al., "Datagram Transport Layer Security Version 1.2", Internet Engineering Task Force (IETF), Request for Comments: 6347, Jan. 2012, pp. 1-32.

Rescorla et al., "The Datagram Transport Layer Security (DTLS) Protocol Version 1.3—draft-ietf-tls-dtls 13-43", TLS, Internet Draft, Obsoletes 6347, Apr. 30, 2021, pp. 1-81.

Rescorla et al., "The Datagram Transport Layer Security (DTLS) Protocol Version 1.3", Internet Engineering Task Force (IETF), Request for Comments: 9147, Apr. 2022, pp. 1-61.

Rescorla et al., "Transport Layer Security (TLS) Renegotiation Indication Extension", Internet Engineering Task Force (IETF), Request for Comments: 5746, Feb. 2010, pp. 1-15.

Rescorla, E., "Keying Material Exporters for Transport Layer Security (TLS)", Internet Engineering Task Force (IETF), Request for Comments: 5705, Mar. 2010, pp. 1-7.

Rescorla, E., "The Transport Layer Security (TLS) Protocol Version 1.3—draft-ietf-tls-tls13-28", Network Working Group, Internet Draft, Obsoletes 5077, 5246, 6961, Mar. 20, 2018, pp. 1-156.

Rescorla, E., "The Transport Layer Security (TLS) Protocol Version 1.3", Internet Engineering Task Force (IETF), Request for Comments: 8446, Aug. 2018, pp. 1-160.

Salowey et al., "IANA Registry Updates for TLS and DTLS", Internet Engineering Task Force (IETF), Request for Comments: 8447, Aug. 2018, pp. 1-20.

Sheffer et al., "Recommendations for Secure Use of Transport Layer Security (TLS) and Datagram Transport Layer Security (DTLS)", Internet Engineering Task Force (IETF), Request for Comments: 7525, May 2015, pp. 1-27.

Sheffer et al., "Summarizing Known Attacks on Transport Layer Security (TLS) and Datagram TLS (DTLS)", Internet Engineering Task Force (IETF), Request for Comments: 7457, Feb. 2015, pp. 1-13.

Stewart et al., "Sockets API Extensions for the Stream Control Transmission Protocol (SCTP)", Internet Engineering Task Force (IETF), Request for Comments: 6458, Dec. 2011, pp. 1-115.

Stewart et al., "Stream Control Transmission Protocol (SCTP) Dynamic Address Reconfiguration", Network Working Group, Request for Comments: 5061, Sep. 2007, pp. 1-41.

Stewart et al., "Stream Control Transmission Protocol (SCTP) Partial Reliability Extension", Network Working Group, Request for Comments: 3758, May 2004, pp. 1-22.

Stewart et al., "Stream Control Transmission Protocol", Internet Engineering Task Force (IETF), Request for Comments: 9260, Jun. 2022, pp. 1-133.

(56) References Cited

OTHER PUBLICATIONS

Stewart et al., "Stream Schedulers and User Message Interleaving for the Stream Control Transmission Protocol", Internet Engineering Task Force (IETF), Request for Comments: 8260, Nov. 2017, pp. 1-23.
Stewart, R., "Stream Control Transmission Protocol", Network Working Group, Request for Comments: 4960, Sep. 2007, pp. 1-152.
Tsuchiya et al., "Dual Stack Hosts using the "Bump-in-the-Stack" Technique (BIS)", Network Working Group, Request for Comments: 2767, Feb. 2000, pp. 1-14.
Tuexen et al., "Authenticated Chunks for the Stream Control Transmission Protocol (SCTP)", Network Working Group, Request for Comments: 4895, Aug. 2007, pp. 1-19.
Tuexen et al., "Datagram Transport Layer Security (DTLS) for Stream Control Transmission Protocol (SCTP)", Internet Engineering Task Force (IETF), Request for Comments: 6083, Jan. 2011, pp. 1-9.
Westerlund et al., "Datagram Transport Layer Security (DTLS) in the Stream Control Transmission Protocol (SCTP) CRYPTO Chunk—draft-westerlund-tsvwg-sctp-crypto-dtls-01", TSVWG, Internet Draft, Jun. 28, 2023, pp. 1-27.
Westerlund et al., "Datagram Transport Layer Security (DTLS) over Stream Control Transmission Protocol (SCTP)—draft-ietf-tsvwg-dtls-over-sctp-bis-01", TSVWG, Internet Draft, Obsoletes 6083, Jul. 12, 2021, pp. 1-14.
Westerlund et al., "Datagram Transport Layer Security (DTLS) over Stream Control Transmission Protocol (SCTP)—draft-ietf-tsvwg-dtls-over-sctp-bis-05", TSVWG, Internet Draft, Oct. 24, 2022, pp. 1-43.
Westerlund et al., "Datagram Transport Layer Security (DTLS) over Stream Control Transmission Protocol (SCTP)", TSVWG, Internet Draft: draft-ietf-tsvwg-dtls-over-sctp-bis-02, Obsoletes 6083, Oct. 25, 2021, 30 pages.
Westerlund et al., "Stream Control Transmission Protocol (SCTP) CRYPTO Chunk—draft-westerlund-tsvwg-sctp-crypto-chunk-02", TSVWG, Internet Draft, Sep. 8, 2023, pp. 1-30.

\* cited by examiner

KEY REPLACEMENT DURING DATAGRAM TRANSPORT LAYER SECURITY (DTLS) CONNECTIONS OVER STREAM CONTROL TRANSMISSION PROTOCOL (SCTP)

CROSS-REFERENCE TO RELATED APPLICATIONS

This application is a National stage of International Application No. PCT/IB2022/057712, filed Aug. 17, 2022, which claims the benefit of U.S. Provisional Application No. 63/270,064, filed Oct. 21, 2021, which isare hereby incorporated by reference.

TECHNICAL FIELD

Embodiments of the invention relate to the field of networking; and more specifically, to using parallel Datagram Transport Layer Security (DTLS) connections over Stream Control Transmission Protocol (SCTP).

BACKGROUND ART

The signaling protocols in the fifth generation (5G) network use interfaces such as next generation control plane interface (NG-C), Xn, E1 and F1 in 5G radio access network (RAN) for transporting sensible data that can be exploited for obtaining information on the mobile equipment, their location and similar. Signaling data is coded with Abstract Syntax Notation One (ASN.1) and transported over Stream Control Transmission Protocol (SCTP) protocol among nodes. The 3rd Generation Partnership Project (3GPP) recommends protecting the data for security and confidentiality with Internet Protocol Security (IPSec). The size of the signals has an arbitrary length, and cases exist with signals up to 144 Kbytes.

Since connections between IPSec gateways and nodes are not protected, 3GPP also recommends adopting DTLS/SCTP for end-to-end protection. DTLS/SCTP protection, according to 3GPP, is mandatory for the node implementor and optional for the operator to activate. Yet the SCTP associations can be very long lived-in some cases with lifetime measured in weeks or months, and peer nodes in an end-to-end node connection need to have a solution for long lived SCTP associations that support large SCTP messages.

SUMMARY OF THE INVENTION

Embodiments include methods, network nodes, storage medium, and computer program to implement parallel Datagram Transport Layer Security (DTLS) connections over a stream control transmission protocol (SCTP) association. In one embodiment, a method at a first network node for encoding user messages for secure transmission to a second network node comprises: initiating a Datagram Transport Layer Security (DTLS) connection over a stream control transmission protocol (SCTP) association through a DTLS handshake using an existing Authenticated Chunks for SCTP (SCTP-AUTH) key from an existing DTLS connection over the SCTP association that transmits user messages; deriving a new SCTP-AUTH key from the initiated DTLS connection; transmitting further user messages through the initiated DTLS connection with the new SCTP-AUTH key; and closing the existing DTLS connection over the SCTP association upon confirmation that SCTP packets encrypted with the existing DTLS connection and SCTP packets authenticated by the existing SCTP-AUTH key have been delivered.

Embodiments include network nodes to implement parallel Datagram Transport Layer Security (DTLS) connections over a stream control transmission protocol (SCTP) association. In one embodiment, a network node comprises a processor and a machine-readable storage medium that provides instructions that, when executed by the processor, are capable of causing the network node to perform: initiating a Datagram Transport Layer Security (DTLS) connection over a stream control transmission protocol (SCTP) association through a DTLS handshake using an existing Authenticated Chunks for SCTP (SCTP-AUTH) key from an existing DTLS connection over the SCTP association that transmits user messages; deriving a new SCTP-AUTH key from the initiated DTLS connection; transmitting further user messages through the initiated DTLS connection with the new SCTP-AUTH key; and closing the existing DTLS connection over the SCTP association upon confirmation that SCTP packets encrypted with the existing DTLS connection and SCTP packets authenticated by the existing SCTP-AUTH key have been delivered.

Embodiments include machine-readable storage media to implement parallel Datagram Transport Layer Security (DTLS) connections over a stream control transmission protocol (SCTP) association. In one embodiment, a machine-readable storage medium that provides instructions that, when executed, are capable of causing a network node to perform: initiating a Datagram Transport Layer Security (DTLS) connection over a stream control transmission protocol (SCTP) association through a DTLS handshake using an existing Authenticated Chunks for SCTP (SCTP-AUTH) key from an existing DTLS connection over the SCTP association that transmits user messages; deriving a new SCTP-AUTH key from the initiated DTLS connection; transmitting further user messages through the initiated DTLS connection with the new SCTP-AUTH key; and closing the existing DTLS connection over the SCTP association upon confirmation that SCTP packets encrypted with the existing DTLS connection and SCTP packets authenticated by the existing SCTP-AUTH key have been delivered.

Embodiments of the invention avoid the application impact that forces an application to pause or at least delay data transmission in a DTLS/SCTP session during the data draining phase at key change with the existing solution. The draining phase is avoided as the DTLS protection records are self-describing and can co-exist. In addition, the independent DTLS connection management enables explicit asynchronous close signaling when each side knows all data using this key have been delivered first, and then closes down the connection and discards the secret keying material.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
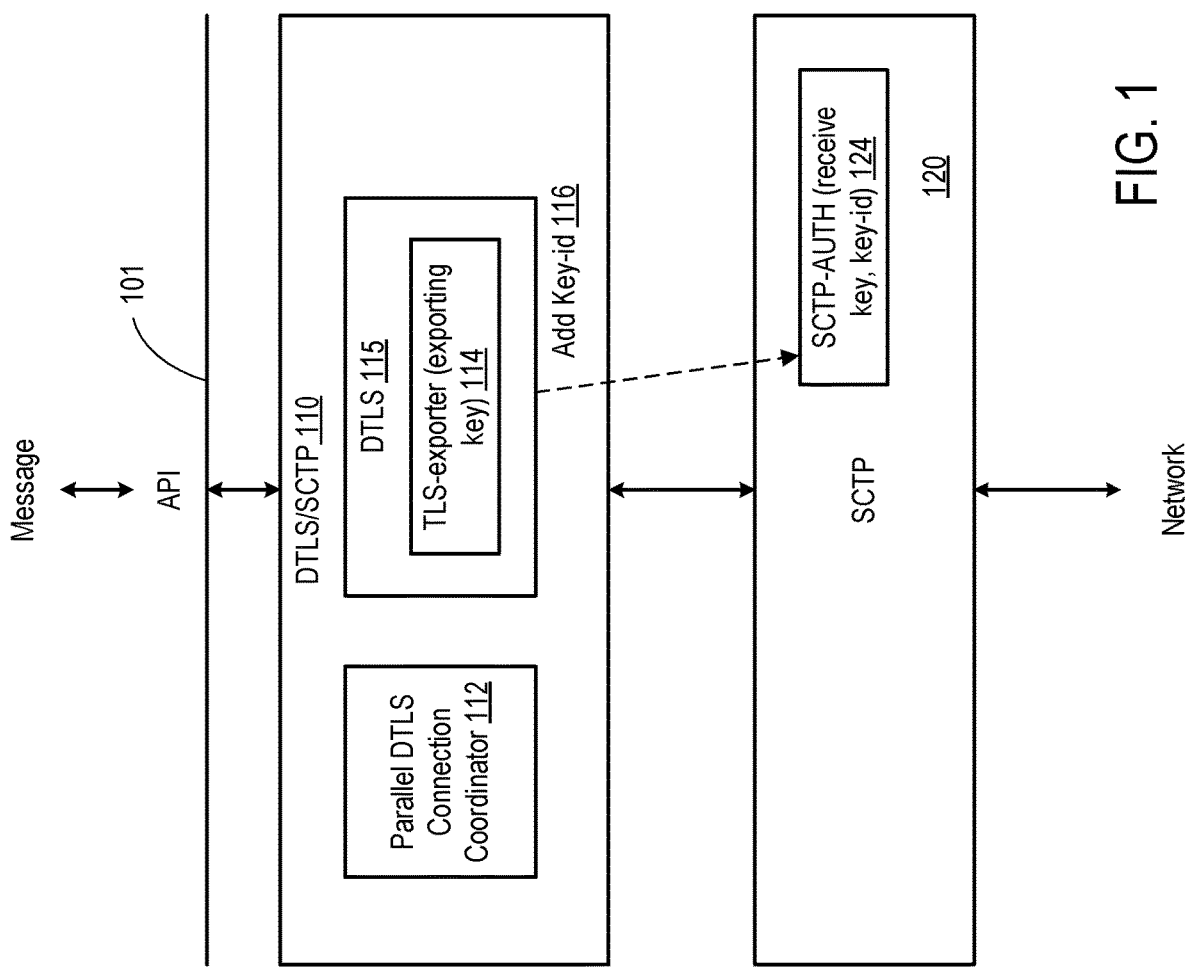
FIG. 1 illustrates a system diagram to provide the enhanced DTLS/SCTP signaling and messaging according to some embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

1. Introduction

To implement long lived Stream Control Transmission Protocol (SCTP) association in existing technology is challenging. For example, Datagram Transport Layer Security (DTLS) 1.3 does not support mutual re-authentication, nor enables rekeying (with Diffie-Hellman) for DTLS itself which makes it not suitable for protecting long lived (weeks and months) SCTP associations like those used in mobile networks in its base form. The procedures for DTLS (1.0 and 1.2) renegotiation per Internet Engineering Task Force (IETF) Request for Comment (RFC) 6083 dealing with change of key can also have impact on the application as it requires draining, i.e., stop sending until all data has been received, prior to key change. Note that the terms of "association" and "SCTP association" are used interchangeably herein.

1.1 Overview

To overcome such challenges, embodiments of the invention establish a new DTLS connection in parallel with the existing one over the same SCTP association, thus enable rekeying, mutual reauthentication, and updated certificates for DTLS protected SCTP association with minimal impact on the application for long lived SCTP associations.

This can safely be done due to mutual authentication in the DTLS handshake and the integrity and source authentication that SCTP-AUTH keyed by the existing DTLS connection provides. When the new handshake has been performed and the security contexts and the keys are in place, both network node endpoints switch over to use the new keys for both DTLS records and the exported key for SCTP-AUTH. The DTLS records uses the DTLS connection identifier (ID) feature, while the SCTP-AUTH uses its key-id mechanism to identify the correct context.

When each sender has ensured that all DTLS records and SCTP packets protected by the old SCTP-AUTH key has been successfully delivered then the old DTLS connection is closed unidirectionally. When both endpoints have closed the DTLS connection, all keys related to this DTLS connection can be removed. Thus, embodiments of the invention enable the parallel existence of two DTLS connections to have minimal impact on the application and still maintain the assumed transport semantics for any SCTP messages that are to be reliably delivered.

In some embodiments, the DTLS over SCTP is used with Authenticated Chunks for SCTP (SCTP-AUTH). The DTLS may be implemented as defined in DTLS 1.2 [IETF RFC 2347] or DTLS 1.3 [IETF RFC 9147], while the SCTP may be implemented as defined in [IETF RFC 4960] with SCTP-AUTH) [IETF RFC 4895]. Applications that use SCTP as their transport protocol may use these and other embodiments to provide mutual authentication of endpoints, confidentiality, integrity protection, and replay protection of user messages.

DTLS/SCTP use SCTP and SCTP-AUTH for integrity protection and replay protection of user messages. Applications using DTLS over SCTP can use almost all transport features provided by SCTP and its extensions. DTLS/SCTP supports features including: 1) preservation of message boundaries; 2) a large number of unidirectional and bidirectional streams; 3) ordered and unordered delivery of SCTP user messages; 4) the partial reliability extension as defined in [IETF RFC 3758]; 5) the dynamic address reconfiguration extension as defined in [IETF RFC 5061]; and 6) User messages size up to $2^{64}-1$. Note unless specified otherwise, a stream in this specification is a unidirectional stream of an SCTP association, and it is uniquely identified by a stream identifier.

Some embodiments may require that the SCTP implementation supports the optional feature of fragmentation of SCTP user messages as defined in [IETF RFC 4960]. The implementation is required to have an SCTP API (for example the one described in [IETF RFC) 6458]) that supports partial user message delivery and also recommended that I-DATA chunks as defined in [IETF RFC 8260] is used to efficiently implement and support larger user messages.

FIG. 1 illustrates a system diagram to provide the enhanced DTLS/SCTP signaling and messaging according to some embodiments. FIG. 1 shows a node 100 that implements a traffic flow, where an Application Programming Interface (API) 101 is the interface between a SCTP functional block (or module) 120 and an Upper Layer Protocol where a message is received or recovered. Interposed between the API 101 and SCTP functional block 120 is a DTLS/SCTP functional block (or module) 110. In some embodiments, the API 101 includes a DTLS API and a SCTP API.

The DTLS/SCTP functional block 110 uses DTLS and SCTP together for protecting user messages and SCTP-AUTH key. The DTLS/SCTP functional block 110 includes a parallel DTLS connection coordinator module 112 that implements embodiments of the invention. In some embodiments, the DTLS/SCTP functional block 110 fragments messages from the Upper Layer Protocol and provides the fragments to SCTP 120, and it defragments messages from SCTP 120 (SCTP packets), assembles them, and provides the assembled messages to the Upper Layer Protocol.

The DTLS/SCTP functional block 110 includes a DTLS module 115, which implements the DTLS protocol and provides DTLS records up to $2^{14}$ bytes in size. The DTLS module 115 includes a TLS-exporter 114 in some embodiments, and the TLS-exporter 114 exports a shared authentication key from a DTLS connection. The shared authentication key is paired with a key-id at reference 116 and provided the key and corresponding key-id to SCTP 120.

SCTP 120 is the function block implementing SCTP protocol, e.g., according to IETF RFC 4960 and the various extensions or other IETF standard proposals. In some embodiments, SCTP functional block 120 includes a SCTP-AUTH module 124 to accept the shared authentication keys and corresponding key-ids that are used for integrity protection, as detailed in Section 4.7 below.

To simplify implementation and reduce the risk for security holes, limitations have been defined such that START-TLS as specified in [IETF RFC 3788] is no longer supported in some embodiments.

1.1.1. Comparison with TLS for SCTP

TLS, from which DTLS was derived, is designed to run on top of a byte-stream-oriented transport protocol providing a reliable, in-sequence delivery. TLS over SCTP as described in [IETF RFC 3436] has some serious limitations:

It does not support the unordered delivery of SCTP user messages;

It does not support partial reliability as defined in [IETF RFC 3758];

It only supports the usage of the same number of streams in both directions; and It uses a TLS connection for every bidirectional stream, which requires a substantial amount of resources and message exchanges if a large number of streams is used.

1.1.2. Changes from IETF RFC 6083

The DTLS over SCTP solution defined in IETF RFC 6083 had the following limitation: The maximum user message size is $2^{14}$ (16,384) bytes, which is a single DTLS record limit.

Embodiments of the invention may replace IETF RFC 6083 and include the following changes:

Removes the limitations on user messages sizes by defining a secure fragmentation mechanism;

Mandates that more modern DTLS version are required (DTLS 1.2 or 1.3);

Mandates use of modern hash-based message authentication code (HMAC) algorithm (SHA-256) in the SCTP authentication extension [IETF RFC 4895];

Recommends support of [IETF RFC 8260] to enable interleaving of large SCTP user messages to avoid scheduling issues;

Applies stricter requirements on always using DTLS for all user messages in the SCTP association;

Requires that SCTP-AUTH is applied to all SCTP Chunks that can be authenticated; and Requires support of partial delivery of user messages.

1.2. DTLS Version

DTLS/SCTP as defined by this document can use either DTLS 1.2 [IETF RFC 6347] or DTLS 1.3 [IETF RFC 9147]. In general, DTLS 1.3 is preferred, being a newer protocol that addresses known vulnerabilities and only defines strong algorithms without known major weaknesses at the time of publication.

Using DTLS 1.2 instead of using DTLS 1.0 limits the lifetime of a DTLS connection and the data volume which can be transferred over a DTLS connection. This is caused by:

The number of renegotiations in DTLS 1.2 is limited to 65534 compared to unlimited in DTLS 1.0; and While the authenticated encryption with associated data (AEAD) limits in DTLS 1.3 does not formally apply to DTLS 1.2 the mathematical limits apply equally well to DTLS 1.2.

DTLS 1.3 comes with a large number of significant changes:

Renegotiations are not supported and instead partly replaced by KeyUpdates. The number of KeyUpdates is limited to $2^{64}$; and Strict AEAD significantly limits on how much many packets can be sent before rekeying.

Many applications using DTLS/SCTP are of semi-permanent nature and use SCTP associations with expected lifetimes of months or even years, and where there is a significant cost of bringing down the SCTP association in order to restart it. Such DTLS/SCTP usages need:

Periodic re-authentication of both endpoints (not only the DTLS client);

Periodic rerunning of Diffie-Hellman key-exchange to provide Perfect Forward Secrecy (PFS) to reduce the impact any key-reveal; and Perform SCTP-AUTH re-keying.

At the time of publication DTLS 1.3 does not support any of these, where DTLS 1.2 renegotiation functionality can provide this functionality in the context of DTLS/SCTP. To address these requirements from semi-permanent applications, embodiments of the invention use several overlapping DTLS connections with either DTLS 1.2 or 1.3. Having uniform procedures reduces the impact when upgrading from 1.2 to 1.3 and avoids using the renegotiation mechanism which is disabled by default in many DTLS implementations.

To address known vulnerabilities in DTLS 1.2 this specification describes and mandates implementation constraints on ciphers, protocol options and how to use the DTLS renegotiation mechanism.

In the rest of the specification, unless the version of DTLS is specifically called out, the text applies to both versions of DTLS.

2. Convention

The key words "MUST", "MUST NOT", "REQUIRED", "SHALL", "SHALL NOT", "SHOULD", "SHOULD NOT", "RECOMMENDED", "NOT RECOMMENDED", "MAY", and "OPTIONAL" in this document are to be interpreted as described in BCP 14 [IETF RFC 2119] [IETF RFC 8174] when, and only when, they appear in all capitals, as shown here.

3. DTLS Considerations

3.1. Version of DTLS

This document defines the usage of either DTLS 1.3 [I-D.ietf-tls-dtls13], or DTLS 1.2[IETF RFC 6347]. Earlier versions of DTLS MUST NOT be used (see [IETF RFC 8996]). It is expected that DTLS/SCTP as described in this document will work with future versions of DTLS.

3.2. Cipher Suites and Cryptographic Parameters

For DTLS 1.2, the cipher suites forbidden by [IETF RFC 7540] MUST NOT be used. For all versions of DTLS, cryptographic parameters giving confidentiality and Perfect Forward Secrecy (PFS) MUST be used.

3.3. Message Sizes

DTLS/SCTP, automatically fragments and reassembles user messages. This specification defines how to fragment the user messages into DTLS records, where each DTLS 1.3 record allows a maximum of 2^14 protected bytes. Each DTLS record adds some overhead, thus using records of maximum possible size are recommended to minimize the transmitted overhead.

The sequence of DTLS records is then fragmented into DATA or I-DATA Chunks to fit the path MTU by SCTP. The largest possible user messages using the mechanism defined in this specification is 2^64-1 bytes.

The security operations and reassembly process require that the protected user message, i.e., with DTLS record overhead, is buffered in the receiver. This buffer space will thus put a limit on the largest size of plain text user message that can be transferred securely. However, by mandating the use of the partial delivery of user messages from SCTP and assuming that no two messages received on the same stream are interleaved (as it is the case when using the API defined in [IETF RFC 6458]) the required buffering prior to DTLS processing can be limited to a single DTLS record per used incoming stream.

This enables the DTLS/SCTP implementation to provide the Upper Layer Protocol (ULP) with each DTLS record's content when it has been decrypted and its integrity been verified enabling partial user message delivery to the ULP. Implementations can trade-off buffer memory requirements in the DTLS layer with transport overhead by using smaller DTLS records.

The DTLS/SCTP implementation is expected to behave very similar to just SCTP when it comes to handling of user messages and dealing with large user messages and their reassembly and processing. Making it the ULP responsible for handling any resource contention related to large user messages.

3.4. Replay Protection

SCTP-AUTH [IETF RFC 4895] does not have explicit replay protection. However, the combination of SCTP-AUTH's protection of DATA or I-DATA chunks and SCTP user message handling will prevent third party attempts to inject or replay SCTP packets resulting in impact on the received protected user message. In fact, this document's solution is dependent on SCTP-AUTH and SCTP to prevent reordering, duplication and removal of the DTLS records within each protected user message. This includes detection of changes to what DTLS records start and end the SCTP user message and removal of DTLS records before an increment to the epoch. Without SCTP-AUTH, these would all have required explicit handling.

DTLS optionally supports record replay detection. Such replay detection could result in the DTLS layer dropping valid messages received outside of the DTLS replay window. As DTLS/SCTP provides replay protection even without DTLS replay protection, the replay detection of DTLS MUST NOT be used.

3.5. Path MTU Discovery

DTLS Path MTU Discovery MUST NOT be used. Since SCTP provides Path MTU discovery and fragmentation/reassembly for user messages, and according to Section 3.3, DTLS can send maximum sized DTLS Records.

3.6. Retransmission of Messages

SCTP provides a reliable and in-sequence transport service for DTLS messages that require it. See Section 4.4. Therefore, DTLS procedures for retransmissions MUST NOT be used.

4. SCTP Considerations

4.1. Mapping of DTLS Records

The SCTP implementation MUST support fragmentation of user messages using DATA [IETF RFC 4960], and optionally I-DATA [IETF RFC 8260] chunks.

DTLS/SCTP works as a shim layer between the user message API and SCTP. The fragmentation works similar as the DTLS fragmentation of handshake messages. On the sender side a user message fragmented into fragments m0, m1, m2, each no larger than 2^14=16384 bytes.

m0|m1|m2| . . . =user_message

The resulting fragments are protected with DTLS and the records are concatenated user_message'=DTLS(m0)|DTLS(m1)|DTLS (m2) . . . .

The new user_message', i.e., the protected user message, is the input to SCTP.

On the receiving side DTLS is used to decrypt the individual records.

There are three failure cases an implementation needs to detect and then act on:

1. Failure in decryption and integrity verification process of any DTLS record. Due to SCTP-AUTH preventing delivery of injected or corrupt fragments of the protected user message this should only occur in case of implementation errors or internal hardware failures or the necessary security context has been prematurely discarded.
2. In case the SCTP layer indicates an end to a user message, e.g., when receiving a MSG_EOR in a recvmsg( ) call when using the API described in [IETF RFC 6458], and the last buffered DTLS record length field does not match, i.e., the DTLS record is incomplete.
3. Unable to perform the decryption processes due to lack of resources, such as memory, and have to abandon the user message fragment. This specification is defined such that the needed resources for the DTLS/SCTP operations are bounded for a given number of concurrent transmitted SCTP streams or unordered user messages.

The above failure cases all result in the receiver failing to recreate the full user message. This is a failure of the transport service that is not possible to recover from in the DTLS/SCTP layer and the sender could believe the complete message have been delivered. This error MUST NOT be ignored, as SCTP lacks any facility to declare a failure on a specific stream or user message, the DTLS connection and the SCTP association SHOULD be terminated. A valid exception to the termination of the SCTP association is if the receiver is capable of notifying the ULP about the failure in delivery and the ULP is capable of recovering from this failure.

Note that if the SCTP extension for Partial Reliability (PR-SCTP) [IETF RFC 3758] is used for a user message, user message may be partially delivered or abandoned. These failures are not a reason for terminating the DTLS connection and SCTP association.

The DTLS Connection ID MUST be negotiated ([draft-ietf-tls-dtls-connection-id] or Section 9 of [I-D.ietf-tls-dtls13]). If DTLS 1.3 is used, the length field MUST be included and a 16-bit sequence number SHOULD be used.

Section 4 of [draft-ietf-tls-dtls-connection-id] states "If, however, an implementation chooses to receive different lengths of CID, the assigned CID values must be self-delineating since there is no other mechanism available to determine what connection (and thus, what CID length) is in use.". As this solution requires multiple connection IDs, using a zero-length CID will be highly problematic as it could result in that any DTLS records with a zero length CID ends up in another DTLS connection context, and there fail the decryption and integrity verification. And in that case to avoid losing the DTLS record, it would have to be forwarded to the zero-length CID using DTLS Connection and decryption and validation must be tried. Resulting in higher resource utilization. Thus, it is RECOMMENDED to not use the zero length CID values and instead use a single common length for the CID values. A single byte should be sufficient, as reuse of old CIDs is possible as long as the implementation ensure they are not used in near time to the previous usage.

4.2. DTLS Connection Handling

A DTLS connection MUST be established at the beginning of the SCTP Association. All DTLS connections are terminated when the SCTP association is terminated. A DTLS connection MUST NOT span multiple SCTP associations.

As it is required to establish the DTLS connection at the beginning of the SCTP association, either of the peers should never send any SCTP user messages that are not protected by DTLS. So, the case that an endpoint receives data that is not either DTLS messages on Stream 0 or protected user messages in the form of a sequence of DTLS Records on any stream is a protocol violation. The receiver MAY terminate the SCTP association due to this protocol violation.

Whenever a mutual authentication, updated security parameters, rerun of Diffie-Hellman key-exchange, or SCTP-AUTH rekeying is needed, a new DTLS connection is instead setup in parallel with the old connection (i.e., there may be up to two simultaneous DTLS connections within one association).

4.3. Payload Protocol Identifier Usage

SCTP Payload Protocol Identifiers are assigned by IANA. Application protocols using DTLS over SCTP SHOULD register and use a separate Payload Protocol Identifier (PPID) and SHOULD NOT reuse the PPID that they registered for running directly over SCTP.

Using the same PPID does not harm as long as the application can determine whether or not DTLS is used. However, for protocol analyzers, for example, it is much easier if a separate PPID is used.

This means, in particular, that there is no specific PPID for DTLS.

4.4. Stream Usage

All DTLS Handshake, Alert, or ChangeCipherSpec (DTLS 1.2 only) messages MUST be transported on stream 0 with unlimited reliability and with the ordered delivery feature.

DTLS messages of the record protocol, which carries the protected user messages, SHOULD use multiple streams other than stream 0; they MAY use stream 0. On stream 0 protected user messages as well as any DTLS messages that aren't record protocol will be mixed, thus the additional head of line blocking can occur.

4.5. Chunk Handling

DATA chunks of SCTP MUST be sent in an authenticated way as described in [IETF RFC 4895]. All other chunks that can be authenticated, i.e., all chunk types that can be listed in the Chunk List Parameter [IETF RFC 4895], MUST also be sent in an authenticated way. This makes sure that an attacker cannot modify the stream in which a message is sent or affect the ordered/unordered delivery of the message.

If partial reliable SCTP (PR-SCTP) as defined in [IETF RFC 3758] is used, FORWARD-TSN chunks MUST also be sent in an authenticated way as described in [IETF RFC 4895]. This makes sure that it is not possible for an attacker to drop messages and use forged FORWARD-TSN, SACK, and/or SHUTDOWN chunks to hide this dropping.

I-DATA chunk type as defined in [IETF RFC 8260] is RECOMMENDED to be supported to avoid some of the down sides that large user messages have on blocking transmission of later arriving high priority user messages. However, the support is not mandated and negotiated independently from DTLS/SCTP. If I-DATA chunks are used, then they MUST be sent in an authenticated way as described in [IETF RFC 4895].

4.6. SCTP-AUTH Hash Function

When using DTLS/SCTP, the SHA-256 Message Digest Algorithm MUST be supported in the SCTP-AUTH [IETF RFC 4895] implementation. SHA-1 MUST NOT be used when using DTLS/SCTP. [IETF RFC 4895] requires support and inclusion of SHA-1 in the HMAC-ALGO parameter, thus, to meet both requirements the HMAC-ALGO parameter will include both SHA-256 and SHA-1 with SHA-256 listed prior to SHA-1 to indicate the preference.

4.7. Parallel DTLS connections

To enable SCTP-AUTH re-rekeying, periodic authentication of both endpoints, and force attackers to dynamic key extraction, DTLS/SCTP per this specification define the usage of parallel DTLS connections over the same SCTP association. This solution ensures that there are no limitations to the lifetime of the SCTP association due to DTLS, it also avoids dependency on DTLS renegotiation (DTLS 1.2 only) or the properties of key-update in DTLS 1.3 which does not allow mutual endpoint re-authentication. Parallel DTLS connections enables opening a new DTLS connection performing a full handshake, maybe using resumption, while the existing DTLS is kept in place. On handshake completion switch to the security context of the new DTLS connection and then ensure delivery of all the SCTP chunks using the old DTLS connections security context. When that has been achieved close the old DTLS connection and discard the related security context.

As specified in Section 4.1 the usage of DTLS connection ID is required to ensure that the receiver can correctly identify the DTLS connection and its security context when performing its de-protection operations. There is also only a single SCTP-AUTH key exported per DTLS connection ensuring that there is clear mapping between the DTLS connection and the SCTP-AUTH security context for each key-id, unless DTLS 1.2 renegotiation is used when multiple keys may be exported.

Application writers should be aware that establishing a new DTLS connections may result in changes of security parameters. See Section 8 for security considerations regarding rekeying.

A DTLS/SCTP Endpoint MUST NOT have more than two DTLS connections open at the same time. Either of the endpoints MAY initiate a new DTLS connection by performing a full DTLS handshake, which MAY use DTLS resumption when applicable. As either endpoint can initiate a DTLS handshake on either side at the same time, either endpoint may receive a DTLS ClientHello when it has sent its own ClientHello. In this case the ClientHello from the endpoint that had the DTLS Client role in the establishment of the existing DTLS connection shall be continued to be processed and the other dropped.

When performing the DTLS handshake the endpoint MUST verify that the peer identifies using the same identity as in the previous DTLS connection.

When the DTLS handshake has been completed, a new SCTP-AUTH key (as shown in FIG. 1) will be exported per Section 4.9 and the new DTLS connection MUST be used for the DTLS protection operation of any future protected SCTP message. The endpoint is RECOMMENDED to use the security context of the new DTLS connection for any DTLS protection operation occurring after the completed handshake. The new SCTP-AUTH key SHALL be used for any SCTP message being sent after the DTLS handshake has completed. There is a possibility to use the new SCTP-AUTH key for any SCTP packets part of an SCTP message that was initiated but not yet fully transmitted prior to the completion of the new DTLS handshake, however the API defined in [IETF RFC 6458] is not supporting this unless the extensions in Section 6 are supported.

The SCTP endpoint will indicate to its peer when the previous DTLS connection and its context is no longer needed for receiving any more data from this endpoint. This is done by having DTLS to send a DTLS close_notify alert. The endpoint MUST NOT send the close_notify until the following two conditions are fulfilled:

1) All SCTP packets containing part of any DTLS record or message protected using the security context of this DTLS connection have been acknowledged in a non-renegable way; and
2) All SCTP packets using the SCTP-AUTH key associated with the security context of this DTLS connection have been acknowledged in a non-renegable way.

There is a very basic way of determining the above conditions for an implementation that enable using the new DTLS connection's security context for all future DTLS records protected and enabling the associated new SCTP-AUTH key at the same time and not use the old context for any future protection operations. Mark the time when the first SCTP chunk has been sent that is part of the first (partial) SCTP message send call that uses the new security context. That SCTP chunk and thus all previous chunks using the older security context must have been delivered to the peer before the Endpoint Failure Detection (See Section 8.1 of [IETF RFC 4960]) would trigger and terminate the SCTP association. Calculate the upper limit for this timeout period, which is dependent on two configurable parameters. The maximum endpoint failure timeout period is the product of the 'Association.Max. Retrans' and RTO.Max parameters. For the default values per [IETF RFC 4960] that would be 10 attempts time with an RTO.Max=60 seconds, i.e., 10 minutes.

For SCTP implementations exposing APIs like [IETF RFC 6458] where it is not possible to change the SCTP-AUTH key for a partial SCTP message initiated before the change of security context will be forced to track the SCTP messages and determine when all using the old security context has been transmitted. This maybe be impossible to do completely reliable without tighter integration between the DTLS/SCTP layer and the SCTP implementation. This type of implementations also has an implicit limitation in how large SCTP messages it can support. Each SCTP message needs have completed delivery and enabling closing of the previous DTLS connection prior to the need to create yet another DTLS connection. Thus, SCTP messages can't be larger than that the transmission completes in less than the duration between the rekeying or re-authentications for this SCTP association.

When the DTLS/SCTP implementation are more tightly integrated with the SCTP stack or have a fuller API that enable the DTLS/SCTP implementation to know when the SCPT messages have been delivered it will be able to close down the old DTLS connection in a timelier fashion, thus supporting more frequent rekeying etc. if needed.

The consequences of sending a DTLS close_notify alert in the old DTLS connection prior to the receiver having received the data can result in failure case 1 described in Section 4.1, which likely result in SCTP association termination.

4.7b. Renegotiation and KeyUpdate

DTLS 1.2 renegotiation enables rekeying (with ephemeral Diffie-Hellman) of DTLS as well as mutual reauthentication inside an DTLS 1.2 connection. Renegotiation has been removed from DTLS 1.3 and partly replaced with post-handshake messages such as KeyUpdate. The parallel DTLS connection solution was specified due to lack of necessary features with DTLS 1.3 considered needed for long lived SCTP associations, such as rekeying (with ephemeral Diffie-Hellman) as well as mutual reauthentication.

This specification recommends against using either of these mechanisms and instead rely on parallel DTLS connections. For DTLS 1.3 there isn't feature parity. Both also have the issue that a DTLS implementation following standards including IETF RFCs may assume a too limited window for SCTP where the previous epoch's security context is maintained and thus changes to epoch handling (Section 4.8) are necessary. Thus, unless the below specified more application impacting draining is used there exist risk of losing data that the sender will have assumed has been reliably delivered.

4.7b.1 DTLS 12 Considerations

The endpoint MUST NOT initiate an DTLS renegotiation in the existing/old DTLS connection after it has initiated the establishment of a new parallel DTLS connection in this SCTP association. In case a new DTLS connection handshake is received after the endpoint has initiated a DTLS renegotiation on the existing DTLS connection, both parties need to complete the renegotiation and the SCPT-AUTH key identifier should be n+1 and the new DTLS connection should use n+2. This may be accomplished by first finishing the renegotiation and hold the new DTLS handshake processing until the renegotiation has completed.

Before sending during renegotiation a ClientHello message or ServerHello message, the DTLS endpoint MUST ensure that all DTLS messages using the previous epoch have been acknowledged by the SCTP peer in a non-revokable way.

Prior to processing a received ClientHello message or ServerHello message, all other received SCTP user messages that are buffered in the SCTP layer and can be delivered to the DTLS layer MUST be read and processed by DTLS.

4.7b.2 DTLS 1.3 Considerations

Before sending a KeyUpdate message, the DTLS endpoint MUST ensure that all DTLS messages have been acknowledged by the SCTP peer in a non-revokable way. After sending the KeyUpdate message, it stops sending DTLS messages until the corresponding Ack message has been processed.

Prior to processing a received KeyUpdate message, all other received SCTP user messages that are buffered in the SCTP layer and can be delivered to the DTLS layer MUST be read and processed by DTLS.

4.7c Operation Flows

In some embodiments, establishing two parallel DTLS connections over a SCTP association includes the following operations:

1. Initiate a new DTLS handshake protected by existing SCTP-AUTH key;

2. Conclude on DTLS handshake and establish new security contexts and export new SCTP-AUTH key that is given a key identifier;
3. Start using the new DTLS connection and the established security context to protect whole or fragments of messages from upper layer protocol and stop using the previous DTLS connection for protecting any new ULP messages;
4. Start using the new SCPT-AUTH key on any future SCTP packets or SCTP messages and not use the old key for any new SCTP messages;
5. Each endpoint determines when all the protected message fragments and SCTP packets have been delivered, then close its direction of the old DTLS connection; and
6. When DTLS connection has closed remove security contexts and the SCTP-AUTH key exported from to this DTLS connection.

Figure 2:
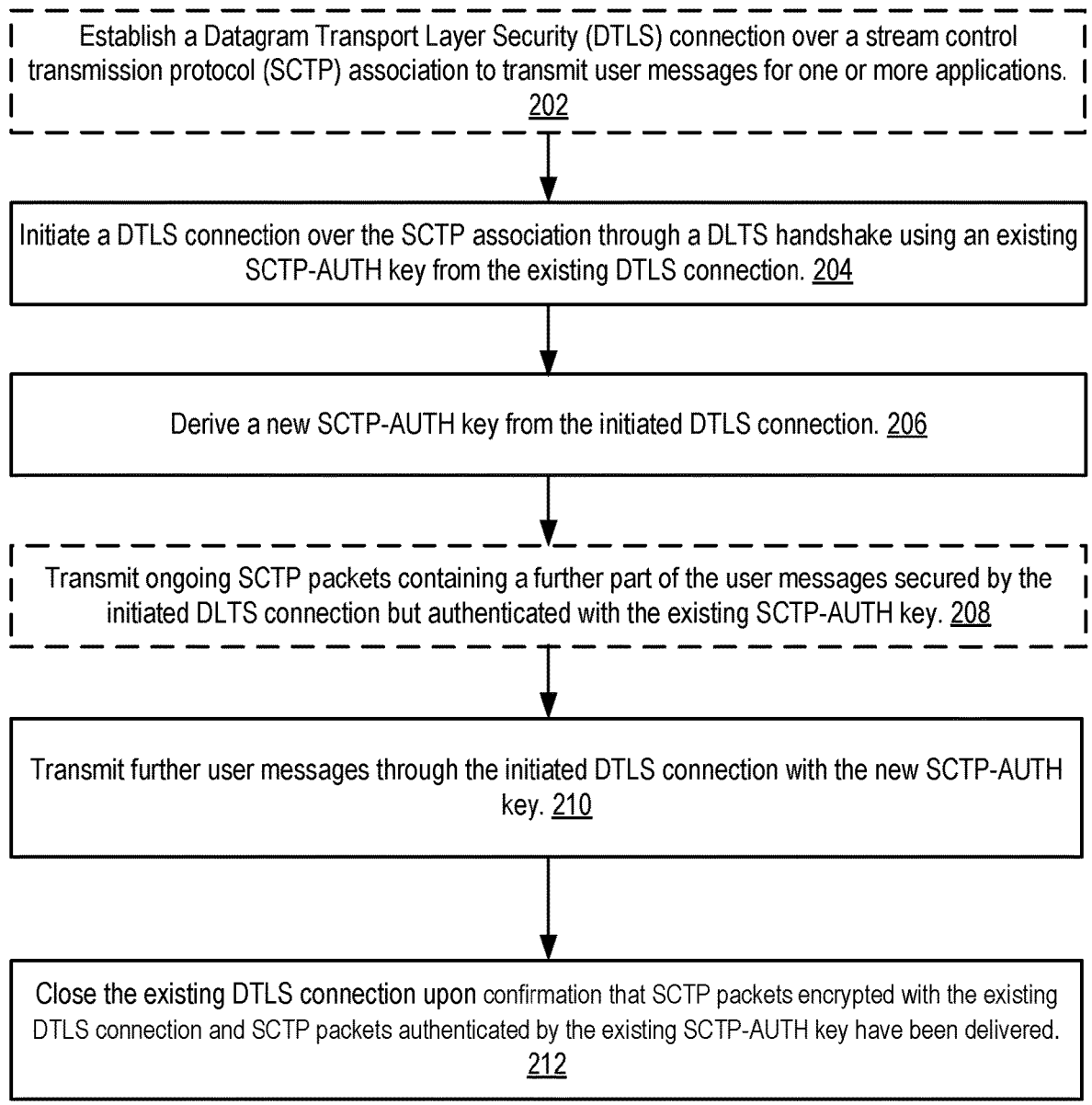
FIG. 2 illustrates operations of establishing parallel DTLS connections over a SCTP association per some embodiments.

FIG. 2 illustrates operations of establishing parallel DTLS connections over a SCTP association per some embodiments. The operations may be performed by a network node that implements parallel DTLS connection coordinator 112. The network node is a first network node that encodes encoding user messages for secure transmission to a second network node in some embodiments.

At reference 202, the network node establishes a Datagram Transport Layer Security (DTLS) connection over a stream control transmission protocol (SCTP) association to transmit user messages for one or more applications. This DTLS connection is the first of two parallel DTLS connections over the same SCTP association and may be referred to as the existing DTLS connection.

At reference 204, the network node initiates a Datagram Transport Layer Security (DTLS) connection over a stream control transmission protocol (SCTP) association through a DTLS handshake using an existing Authenticated Chunks for SCTP (SCTP-AUTH) key from the existing DTLS connection over the SCTP association that transmits user messages. The initiated DTLS connection is the second of the two parallel DTLS connections over the same SCTP association.

At reference 206, the network node derives a new SCTP-AUTH key from the initiated DTLS connection. Optionally at reference 208, the network node transmits ongoing SCTP packets containing a further part of the user messages secured by the initiated DLTS connection but authenticated with the existing SCTP-AUTH key in some embodiments. Alternatively, the network node may transmit the ongoing SCTP packets containing the further part of the user messages to be secured by the existing DTLS connection and authenticated with the existing SCTP-AUTH keys.

At reference 210, the network node transmits further user messages through the initiated DTLS connection with the new SCTP-AUTH key. At reference 212, the network node closes the existing DTLS connection over the SCTP association upon confirmation that SCTP packets encrypted with the existing DTLS connection and SCTP packets authenticated by the existing SCTP-AUTH key have been delivered.

In some embodiments, closing the existing DTLS connection over the SCTP association comprises sending a first DTLS connection close notification to the second network node. The first DTLS connection close notification may be the DTLS close_notify alert discussed herein above.

In some embodiments, closing the existing DTLS connection over the SCTP association further comprises receiving a second DTLS connection close notification from the second network node.

In some embodiments, sending the first DTLS connection close notification comprises confirming transmitted data in the existing DTLS connection has been acknowledged by the second network node in a non-renegable way prior to sending the first DTLS connection close notification. For example, the confirmation comprises to confirm 1) all SCTP packets containing part of any DTLS record or message protected using the security context of this DTLS connection have been acknowledged in a non-renegable way, and/or 2) all SCTP packets using the SCTP-AUTH key associated with the security context of this DTLS connection have been acknowledged in a non-renegable way.

In some embodiments, the existing and new SCTP-AUTH keys are identified by corresponding existing and new key identifiers (IDs), wherein the new key identifier is a value increase by one from the existing key identifier. As the example above shows, if the previous shared secret used a shared key identifier n, the new one uses shared key identifier n+1. In some embodiments, modulo operation may be performed, e.g., the new shared key identifier is (n+1) mod 65535 for 16-bit implementation (when result=0, set to 1; e.g., When n=65534, n+1=65535, and (n+1) mod (65535) =0, thus the new key ID is 1). When the key ID is implemented in another bit width, the divisor will change as well. For example, the divisor is 255 when the key ID is implemented in 8 bits.

In some embodiments, the DTLS connection is established prior to one or more certificates of the existing DTLS connection over the SCTP association expire. In some embodiments, initiating the DTLS connection over the SCTP association through the DTLS handshake comprises maintaining the one or more certificates of the existing DTLS connection including timestamps in the one or more certificates.

In some embodiments, performing the handshake between the first and second network nodes comprises, in response to initiating the handshake and receiving an initiation of the handshake, continuing the initiated handshake when the first network node is to serve as a DTLS client of the DTLS2 connection.

In some embodiments, the existing SCTP-AUTH key is removed upon closure of the existing DTLS connection.

Embodiments of the invention avoid the application impact that forces an application to pause or at least delay data transmission in a DTLS/SCTP session during the data draining phase at key change with the existing solution. The draining phase is avoided as the DTLS protection records are self-describing (a feature of DTLS 1.3 and extension for DTLS 1.2) and can co-exist when session ID is enabled. In addition, the independent DTLS connection management enables explicit asynchronous close signaling when each side knows all data using this key have been delivered first, and then closes down the connection and discards the secret keying material. Thus, parallel DTLS connections avoids several issues that using DTLS 1.2 with Renegotiation. And it ensures that important features can be realized also when DTLS 1.3 is used.

4.8 DTLS Epochs

In general, DTLS implementations SHOULD discard records from earlier epochs. However, in the context of a reliable communication this is not appropriate.

4.8.1 DTLS 1.2 Considerations

The procedures of Section 4.1 of [IETF RFC 6347] MUST NOT be followed.

Instead, when currently using epoch n, for n>1, DTLS packets from epoch n−1 and n MUST be processed.

4.8.2. DTLS 1.3 Considerations

The procedures of Section 4.2.1 of [I-D.ietf-tls-dtls13] are irrelevant. When receiving DTLS packets using epoch n, no DTLS packets from earlier epochs are received.

4.9. Handling of Endpoint-Pair Shared Secrets

SCTP-AUTH [IETF RFC 4895] is keyed using Endpoint-Pair Shared Secrets. In SCTP associations where DTLS is used, DTLS is used to establish these secrets. The endpoints MUST NOT use another mechanism for establishing shared secrets for SCTP-AUTH. The endpoint-pair shared secret for Shared Key Identifier 0 is empty and MUST be used when establishing the first DTLS connection.

The initial DTLS connection will be used to establish a new shared secret as specified per DTLS version below, and which MUST use shared key identifier 1. After sending the DTLS Finished message, the active SCTP-AUTH key MUST be switched to the new one. Once the initial Finished message from the peer has been processed by DTLS, the SCTP-AUTH key with Shared Key Identifier 0 MUST be removed.

When a subsequent DTLS connection is setup, a new a 64-byte shared secret is derived using the TLS-Exporter. The shared secret identifiers form a sequence. If the previous shared secret used Shared Key Identifier n, the new one MUST use Shared Key Identifier n+1.

After sending the DTLS Finished message, the active SCTP-AUTH key MUST be switched to the new one. When the endpoint has both sent and received a closeNotify on the old DTLS connection then the endpoint SHALL remove shared secret(s) related to old DTLS connection.

4.9.1. DTLS 1.2 Considerations

Whenever the master secret changes, i.e. either due to DTLS Renegotiation or the establishment of a new DTLS connection, a 64-byte shared secret is derived from every master secret and provided as a new endpoint-pair shared secret by using the TLS-Exporter described in [IETF RFC 5705].

The 64-byte shared secret MUST be provided to the SCTP stack as soon as the computation is possible. The exporter MUST use the label given in Section 7 and no context. The shared key identifier is selected per the above to be n+1 also for epoch changes due to renegotiation.

Once the Finished message using DTLS epoch m with m>2 has been processed by DTLS, the SCTP-AUTH key with Shared Key Identifier for this DTLS connection and epoch m−2 MUST be removed.

When the DTLS connection closes and it has used renegotiation, all non-removed shared keys MUST be removed, which should be n and n−1, if the new DTLS connection has created n+1.

4.9.2. DTLS 1.3 Considerations

When the exporter_secret can be computed, a 64-byte shared secret is derived from it and provided as a new endpoint-pair shared secret by using the TLS-Exporter described in [IETF RFC 8446]. The 64-byte shared secret MUST be provided to the SCTP stack as soon as the computation is possible. The exporter MUST use the label given in Section Section 7 and no context.

4.10. Shutdown

To prevent DTLS from discarding DTLS user messages while it is shutting down, a CloseNotify message MUST only be sent after all outstanding SCTP user messages have been acknowledged by the SCTP peer in a non-revokable way.

Prior to processing a received CloseNotify, all other received SCTP user messages that are buffered in the SCTP layer MUST be read and processed by DTLS.

5. DTLS Over SCTP Service

The adoption of DTLS over SCTP according to the current description is meant to add to SCTP the option for transferring encrypted data.

When DTLS over SCTP is used, all data being transferred MUST be protected by chunk authentication and DTLS encrypted. Chunks that need to be received in an authenticated way will be specified in the CHUNK list parameter according to [IETF RFC 4895]. Error handling for authenticated chunks is according to [IETF RFC 4895].

5.1. Adaptation Layer Indication in INIT/INIT-ACK

At the initialization of the association, a sender of the INIT or INIT ACK chunk that intends to use DTLS/SCTP as specified in this specification MUST include an Adaptation Layer Indication Parameter with the IANA assigned value TBD (Section 7.2) to inform its peer that it is able to support DTLS over SCTP per this specification.

5.2. DTLS over SCTP Initialization

Figure 3:
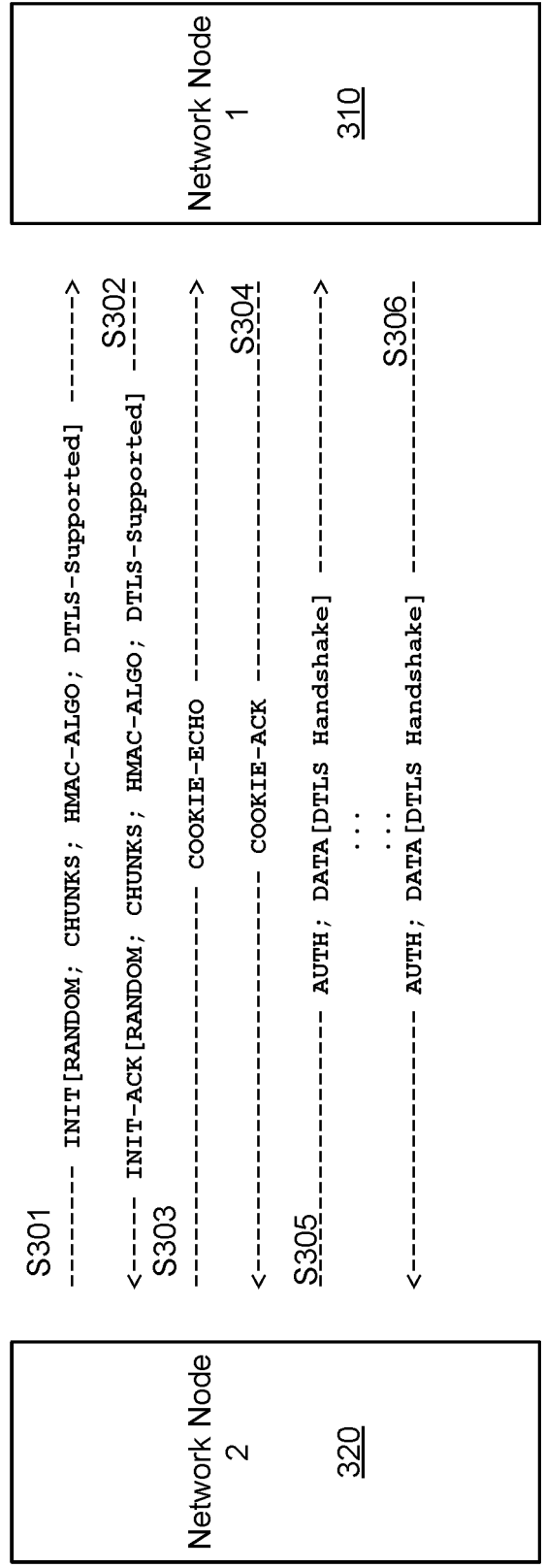
FIG. 3 illustrates a signaling diagram 300 between a first node and a second node, according to some embodiments of the present disclosure.

FIG. 3 illustrates a signaling diagram 300 between a first node and a second node, according to some embodiments of the present disclosure. Diagram 300 illustrates the initialization between a first node (network node 1) 310 and a second node (network node 2) 320. Network node 1 and network node 2 may be any type of nodes that communicate with each other, such as nodes in a communication network.

Initialization of DTLS/SCTP requires all the following options to be part of the INIT/INIT-ACK handshake:

RANDOM: defined in [IETF RFC 4895]

CHUNKS: list of permitted chunks, defined in [IETF RFC 4895]

HMAC-ALGO: defined in [IETF RFC 4895]

ADAPTATION-LAYER-INDICATION: defined in [IETF RFC 5061]

When all the above options are present, the Association will start with support of DTLS/SCTP. The set of options indicated are the DTLS/SCTP Mandatory Options. No data transfer is permitted before DTLS handshake is complete. Chunk bundling is permitted according to [IETF RFC 4960]. The DTLS handshake will enable authentication of both the peers and also have the declare their support message size.

It is to be appreciated that other options or alternative techniques may be implemented. When the above options are present, the association starts with the node 320 initiating the signaling. The DTLS-Supported indication (or similar alternatives) in INIT S301 notifies the node 310 that node 320 supports the enhanced DTLS/SCTP. In some embodiments, the DTLS-Supported indication is an Adaptation-Layer-Indication with the value indicating the DTLS/SCTP feature. No data transfer is permitted before DTLS handshake is complete. Data chunks that are received before DTLS handshake can be silently discarded. Chunk bundling is permitted according to IETF RFC 4960. The DTLS handshake will enable authentication of both the peers and also have their supported message size.

When the SCTP client node 320 initiates the association S301, the DTLS-Supported indication signals to the node 310 that the client supports the enhanced DTLS/SCTP Option, and DTLS-Supported can also indicate a size of the message it can receive or, alternatively, a number of DTLS fragments it can receive. A variety of factors can limit the message size or number of fragments it can receive. In response, the server node 310 sends an INIT-ACK S302, also containing the enhanced DTLS/SCTP Option, to indicate that the node 310 is capable of the enhancement and not relegated to the legacy usage of only a single DTLS segment. In some embodiments, the DTLS-Supported may only contain information related to the ability to implement the enhanced DTLS/SCTP. In that instance, the information pertaining to message/fragment size can be interchanged in a later handshake signal as described below. The DTLS-Supported signaling can contain other information as well for transfer between the two nodes.

The node 320 can receive an INIT-ACK S302 also containing the enhanced DTLS/SCTP Option to indicate that the node 310 is capable of the enhancement and not relegated to the legacy usage of only a single DTLS segment. The term "Option" refers to the instances in some embodiments where there is an option of using the legacy technique or the enhanced technique. In some embodiments, the enhanced technique can be made a mandatory requirement. If the node 310 replies with an INIT-ACK not containing the enhanced DTLS/SCTP Option, the node 320 can decide to keep on working with legacy IETF RFC 6083 (e.g., single DTLS), plain data only, or to abort the association.

If the node 310 (e.g., the SCTP Server) supports the enhanced DTLS/SCTP, when receiving an INIT signaling S301 with the DTLS/SCTP Option, it can reply with an INIT-ACK signaling S302 also containing the enhanced DTLS/SCTP Option, to indicate that node 310 is capable of sending the enhanced DTLS/SCTP. The node 310 can follow the sequence for DTLS initialization and the related traffic case. After transfer of SCTP COOKIE-ECHO S303 and COOKIE-ACK S304 signaling, the node 320 sends DTLS Handshake S305 to begin the DTLS transfer. In response, the node 310 sends the message in enhanced DTLS/SCTP at S306, based on the size limitation indicated by the node 320.

As noted above, in some embodiments, the signaling of the message size or the number of fragments the node 320 can receive can be included with the DTLS-Supported indication at S301. However, in some embodiments, this information can be transmitted during the initiation of DTLS Handshake S305, instead of in DTLS-Supported. Furthermore, other embodiments may provide this information in other signaling.

5.3 Client Use Case

When a client initiates an SCTP Association with DTLS protection, i.e., the SCTP INIT containing DTSL/SCTP Mandatory Options, it can receive an INIT-ACK also containing DTLS/SCTP Mandatory Options, in that case the Association will proceed as specified in the previous Section 5.2 section. If the peer replies with an INIT-ACK not containing all DTLS/SCTP Mandatory Options, the client SHOULD reply with an SCTP ABORT.

5.4. Server Use Case

If a SCTP Server supports DTLS/SCTP, i.e., per this specification, when receiving an INIT chunk with all DTLS/SCTP Mandatory Options it will reply with an INIT-ACK also containing all the DTLS/SCTP Mandatory Options, following the sequence for DTLS initialization Section 5.2 and the related traffic case. If a SCTP Server that supports DTLS and configured to use it, receives an INIT chunk without all DTLS/SCTP Mandatory Options, it SHOULD reply with an SCTP ABORT.

5.5. IETF RFC 6083 Fallback

This section discusses how an endpoint supporting this specification can fallback to follow the DTLS/SCTP behavior in IETF RFC 6083. It is recommended to define a setting that represents the policy to allow fallback or not. However, the possibility to use fallback is based on the ULP can operate using user messages that are no longer than 16384 bytes and where the security issues can be mitigated or considered acceptable. Fallback is NOT RECOMMEND to be enabled as it enables downgrade to weaker algorithms and versions of DTLS.

An SCTP endpoint that receives an INIT chunk or an INIT-ACK chunk that does not contain the SCTP-Adaptation-Indication parameter with the DTLS/SCTP adaptation layer codepoint, see Section 7.2, may in certain cases potentially perform a fallback to IETF RFC 6083 behavior. However, the fallback attempt should only be performed if policy says that is acceptable.

If fallback is allowed, it is possible that the client will send plain text user messages prior to DTLS handshake as it is allowed per IETF RFC 6083. So that needs to be part of the consideration for a policy allowing fallback.

6. Socket API Considerations

This section describes how the socket API defined in [IETF RFC6458] is extended to provide a way for the application to observe the HMAC algorithms used for sending and receiving of AUTH chunks.

Please note that this section is informational only.

A socket API implementation based on [IETF RFC6458] is, by means of the existing SCTP_AUTHENTICATION_EVENT event, extended to provide the event notification whenever a new HMAC algorithm is used in a received AUTH chunk.

Furthermore, two new socket options for the level IPPROTO_SCTP and the name SCTP_SEND_HMAC_IDENT and SCTP_EXPOSE_HMAC_IDENT CHANGES are defined as described below. The first socket option is used to query the HMAC algorithm used for sending AUTH chunks. The second enables the monitoring of HMAC algorithms used in received AUTH chunks via the SCTP_AUTHENTICATION_EVENT event.

Support for the SCTP_SEND_HMAC_IDENT and SCTP_EXPOSE_HMAC_IDENT_CHANGES socket options also needs to be added to the function sctp_opt_info( ).

6.1. Socket Option to Get the HMAC Identifier Being Sent (SCTP_SEND_HMAC_IDENT)

During the SCTP association establishment a HMAC Identifier is selected which is used by an SCTP endpoint when sending AUTH chunks.

An application can access the result of this selection by using this read-only socket option, which uses the level IPPROTO_SCTP and the name SCTP_SEND_HMAC_IDENT.Devices The following structure is used to access HMAC Identifier used for sending AUTH chunks:

```
struct sctp_assoc_value {
    sctp_assoc_t assoc_id;
    uint32_t assoc_value;
};
``` assoc_id: This parameter is ignored for one-to-one style sockets.

For one-to-many style sockets, the application fills in an association identifier. It is an error to use SCTP_{FUTURE|CURRENT|ALL}_ASSOC in assoc_id.

assoc_value: This parameter contains the HMAC Identifier used for sending AUTH chunks.

6.2. Exposing the HMAC Identifiers being Received

Section 6.1.8 of [IETF RFC 6458] defines the SCTP_AUTHENTICATION EVENT event, which uses the following structure:

```
struct sctp_authkey_event {
   uint16_t auth_type;
   uint16_t auth_flags;
   uint32_t auth_length;
   uint16_t auth_keynumber;
   uint32_t auth_indication;
   sctp_assoc_t auth_assoc_id;
};
```

This Specification updates this structure to

```
struct sctp_authkey_event {
   uint16_t auth_type;
   uint16_t auth_flags;
   uint32_t auth_length;
   uint16_t auth_identifier; /* formerly auth_keynumber */
   uint32_t auth_indication;
   sctp_assoc_t auth_assoc_id;
};
``` by renaming auth_keynumber to auth_identifier. auth_identifier just replaces auth_keynumber in the context of [IETF RFC 6458]. In addition to that, the SCTP_AUTHENTICATION_EVENT event is extended to also indicate when a new HMAC Identifier is received, and such reporting is explicitly enabled as described in Section 6.3. In this case auth_indication is SCTP_AUTH_NEW_HMAC and the new HMAC identifier is reported in auth_identifier.

6.3. Socket Option to Expose HMAC Identifier Usage (SCTP_EXPOSE_HMAC_IDENT_CHANGES)

This option allows the application to enable and disable the reception of SCTP_AUTHENTICATION_EVENT events when a new HMAC Identifiers has been received in an AUTH chunk (see Section 6.2).

This read/write socket option uses the level IPPROTO_SCTP and the name SCT_EXPOSE_HMAC_IDENT_CHANGES. It is needed to provide backwards compatibility and the default is that these events are not reported.

The following structure is used to enable or disable the reporting of newly received HMAC Identifiers in AUTH chunks:

```
struct sctp_assoc_value {
   sctp_assoc_t assoc_id;
   uint32_t assoc_value;
};
``` assoc_id: This parameter is ignored for one-to-one style sockets.

For one-to-many style sockets, the application may fill in an association identifier or SCTP_{FUTURE|CURRENT|ALL}_ASSOC.

assoc_value: Newly received HMAC Identifiers are reported if, and only if, this parameter is non-zero.

7. IANA Considerations 7.1. TLS Exporter Label

IETF RFC 6083 defined a TLS Exporter Label registry as described in [IETF RFC 5705]. IANA is requested to update the reference for the label "EXPORTER_DTLS_OVER_SCTP" to this specification.

7.2. SCTP Adaptation Layer Indication Code Point

[IETF RFC 5061] defined a IANA registry for Adaptation Code Points to be used in the Adaptation Layer Indication parameter.

8. Security Considerations

The security considerations given in [I-D.ietf-tls-dtls13], [IETF RFC 4895], and [IETF RFC 4960] also apply to this document.

8.1. Cryptographic Considerations

Over the years, there have been several serious attacks on earlier versions of Transport Layer Security (TLS), including attacks on its most commonly used ciphers and modes of operation. [IETF RFC 7457] summarizes the attacks that were known at the time of publishing and BCP 195 [IETF RFC 7525] [IETF RFC 8996] provide recommendations for improving the security of deployed services that use TLS.

When DTLS/SCTP is used with DTLS 1.2 [IETF RFC 6347], DTLS 1.2 MUST be configured to disable options known to provide insufficient security.

HTTP/2 [IETF RFC 7540] gives good minimum requirements based on the attacks that where publicly known in 2015. DTLS 1.3 [I-D.ietf-tls-dtls13] only define strong algorithms without major weaknesses at the time of publication. Many of the TLS registries have a "Recommended" column.

Parameters not marked as "Y" are NOT RECOMMENDED to support. DTLS 1.3 is preferred being a newer protocol that addresses known vulnerabilities and only defines strong algorithms without known major weaknesses at the time of publication.

DTLS 1.3 requires rekeying before algorithm specific AEAD limits have been reached. The AEAD limits equations are equally valid for DTLS 1.2 and SHOULD be followed for DTLS/SCTP, but are not mandated by the DTLS 1.2 specification.

HMAC-SHA-256 as used in SCTP-AUTH has a very large tag length and very good integrity properties. The SCTP-AUTH key can be used longer than the current algorithms in the TLS record layer. The SCTP-AUTH key is rekeyed when a new connection is set up at which point a new SCTP-AUTH key is derived using the TLS-Exporter.

DTLS/SCTP is in many deployments replacing IPsec. For IPsec, NIST(US), BSI (Germany), and ANSSI(France) recommends very frequent re-run of Diffie-Hellman to provide Perfect Forward Secrecy and force attackers to dynamic key extraction. ANSSI writes "It is recommended to force the periodic renewal of the keys, e.g., every hour and every 100 GB of data, in order to limit the impact of a key compromise." [ANSSI-DAT-NT-003].

For many DTLS/SCTP deployments the DTLS connections are expected to have very long lifetimes of months or even years. For connections with such long lifetimes there is a need to frequently re-authenticate both client and server. TLS Certificate lifetimes significantly shorter than a year are common which is shorter than many expected DTLS/SCTP associations.

SCTP-AUTH re-rekeying, periodic authentication of both endpoints, and frequent re-run of Diffie-Hellman to force attackers to dynamic key extraction is in DTLS/SCTP per this specification achieved by setting up new DTLS connections over the same SCTP association. Implementations SHOULD set up new connections frequently to force attackers to dynamic key extraction. Implementations MUST set up new connections before any of the certificates expire. It is RECOMMENDED that all negotiated and exchanged parameters are the same except for the timestamps in the certificates if the certificates are new. Note that some parameters typically change in a new handshake such as the random number and the connection id. Note that some parameters typically change in a new certificate such as the serial number. Clients and servers MUST NOT accept a change of identity during the setup of a new connections, but MAY accept negotiation of stronger algorithms and security parameters, which might be motivated by new attacks.

When using DTLS 1.2 [IETF RFC 6347], AEAD limits, frequent re-authentication and frequent re-run of Diffie-Hellman, can also be achieved with renegotiation, see TLS 1.2 [IETF RFC 5246]. If renegotiation is used both clients and servers MUST use the renegotiation_info extension [IETF RFC 5746] and MUST follow the renegotiation guidelines in BCP 195 [IETF RFC 7525]. In particular, both clients and servers MUST NOT accept a change of identity during Renegotiation. Renegotiation is disabled by default in many DTLS implementations. While Renegotiation updates the exporter_secret, DTLS/SCTP per this specification only derive new SCTP-AUTH keys when a new connection is set up.

In DTLS 1.3 renegotiation has been removed from DTLS 1.3 and partly replaced with Post-Handshake KeyUpdate. When using DTLS 1.3 [I-D.ietf-tls-dtls13], AEAD limits can also be achieved by sending frequent post-handshake KeyUpdate messages.

Symmetric rekeying gives significantly less protection against key leakage than rerunning Diffie-Hellman. After leakage of application_traffic_secret_N, a passive attacker can passively eavesdrop on all future application data sent on the connection including application data encrypted with application_traffic_secret_N+1, application_traffic_secret_N+2, etc.

Note that KeyUpdate does not update the exporter_secret.

Allowing client initiated renegotiation and client initiated new connections can enable denial-of-service attacks. The server should limit the frequency of client initiated renegotiation and new connections.

When DTLS/SCTP is used with DTLS 1.2 [IETF RFC 6347], the TLS Session Hash and Extended Master Secret Extension [IETF RFC 7627] MUST be used to prevent unknown key-share attacks where an attacker establishes the same key on several connections. DTLS 1.3 always prevents these kinds of attacks. The use of SCTP-AUTH then cryptographically binds new connections to the old connection. This together with mandatory mutual authentication (on the DTLS layer) and a requirement to not accept new identities mitigates MITM attacks that have plagued renegotiation [3SHAKE].

8.2. Downgrade Attacks

A peer supporting DTLS/SCTP according to this specification, DTLS/SCTP according to [IETF RFC 6083] and/or SCTP without DTLS may be vulnerable to downgrade attacks where on on-path attacker interferes with the protocol setup to lower or disable security.

If possible, it is RECOMMENDED that the peers have a policy only allowing DTLS/SCTP according to this specification.

8.3. Authentication and Policy Decisions

DTLS/SCTP MUST be mutually authenticated. It is RECOMMENDED that DTLS/SCTP is used with certificate-based authentication. All security decisions MUST be based on the peer's authenticated identity, not on its transport layer identity.

It is possible to authenticate DTLS endpoints based on IP addresses in certificates. SCTP associations can use multiple IP addresses per SCTP endpoint. Therefore, it is possible that DTLS records will be sent from a different source IP address or to a different destination IP address than that originally authenticated. This is not a problem provided that no security decisions are made based on the source or destination IP addresses.

8.4. Privacy Considerations

[IETF RFC 6973] suggests that the privacy considerations of IETF protocols be documented.

For each SCTP user message, the user also provides a stream identifier, a flag to indicate whether the message is sent ordered or unordered, and a payload protocol identifier. Although DTLS/SCTP provides privacy for the actual user message, the other three information fields are not confidentiality protected. They are sent as cleartext because they are part of the SCTP DATA chunk header.

It is RECOMMENDED that DTLS/SCTP is used with certificate based authentication in DTLS 1.3 [I-D.ietf-tls-dtls13] to provide identity protection. DTLS/SCTP MUST be used with a key exchange method providing Perfect Forward Secrecy. Perfect Forward Secrecy significantly limits the amount of data that can be compromised due to key compromise.

8.5. Pervasive Monitoring

As required by [IETF RFC 7258], work on IETF protocols needs to consider the effects of pervasive monitoring and mitigate them when possible.

Pervasive Monitoring is widespread surveillance of users. By encrypting more information including user identities, DTLS 1.3 offers much better protection against pervasive monitoring.

Massive pervasive monitoring attacks relying on key exchange without forward secrecy has been reported. By mandating perfect forward secrecy, DTLS/SCTP effectively mitigate many forms of passive pervasive monitoring and limits the amount of compromised data due to key compromise.

An important mitigation of pervasive monitoring is to force attackers to do dynamic key exfiltration instead of static key exfiltration. Dynamic key exfiltration increases the risk of discovery for the attacker [IETF RFC 7624]. DTLS/SCTP per this specification encourages implementations to frequently set up new DTLS connections over the same SCTP association to force attackers to do dynamic key exfiltration.

In addition to the privacy attacks discussed above, surveillance on a large scale may enable tracking of a user over a wider geographical area and across different access networks. Using information from DTLS/SCTP together with information gathered from other protocols increase the risk of identifying individual users.

9. Implementing Embodiments of the Invention

Figure 4:
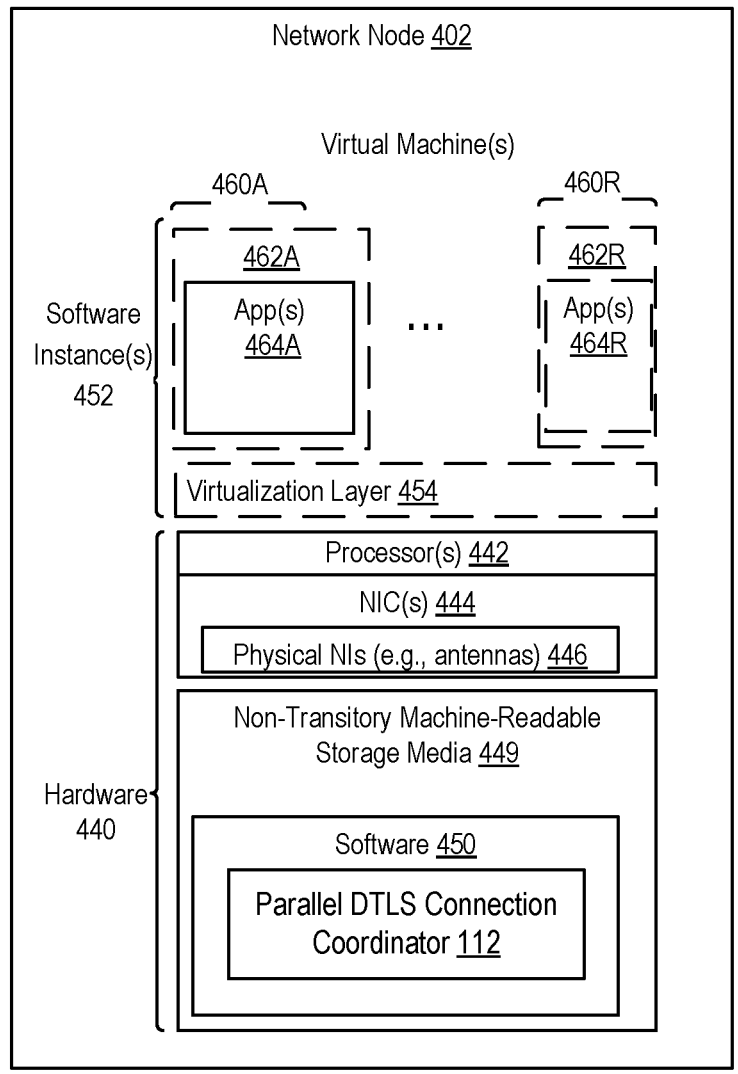
FIG. 4 illustrates a network node implementing parallel DTLS connections over a SCTP association per some embodiments.

FIG. 4 illustrates a network node implementing parallel DTLS connections over a SCTP association per some embodiments. The network node 402 may be implemented using custom application-specific integrated-circuits (ASICs) as processors and a special-purpose operating system (OS), or common off-the-shelf (COTS) processors and a standard OS.

The network node 402 includes hardware 440 comprising a set of one or more processors 442 (which are typically COTS processors or processor cores or ASICs) and physical NIs 446, as well as non-transitory machine-readable storage media 449 having stored therein software 450. During operation, the one or more processors 442 may execute the software 450 to instantiate one or more sets of one or more applications 464A-R. While one embodiment does not implement virtualization, alternative embodiments may use different forms of virtualization. For example, in one such alternative embodiment, the virtualization layer 454 represents the kernel of an operating system (or a shim executing on a base operating system) that allows for the creation of multiple instances 462A-R called software containers that may each be used to execute one (or more) of the sets of applications 464A-R. The multiple software containers (also called virtualization engines, virtual private servers, or jails) are user spaces (typically a virtual memory space) that are separate from each other and separate from the kernel space in which the operating system is run. The set of applications running in a given user space, unless explicitly allowed, cannot access the memory of the other processes. In another such alternative embodiment, the virtualization layer 454 represents a hypervisor (sometimes referred to as a virtual machine monitor (VMM)) or a hypervisor executing on top of a host operating system, and each of the sets of applications 464A-R run on top of a guest operating system within an instance 462A-R called a virtual machine (which may in some cases be considered a tightly isolated form of software container) that run on top of the hypervisor—the guest operating system and application may not know that they are running on a virtual machine as opposed to running on a "bare metal" host electronic device, or through para-virtualization the operating system and/or application may be aware of the presence of virtualization for optimization purposes. In yet other alternative embodiments, one, some, or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 440, directly on a hypervisor (in which case the unikernel is sometimes described as running within a LibOS virtual machine), or in a software container, embodiments can be implemented fully with unikernels running directly on a hypervisor represented by virtualization layer 454, unikernels running within software containers represented by instances 462A-R, or as a combination of unikernels and the above-described techniques (e.g., unikernels and virtual machines both run directly on a hypervisor, unikernels, and sets of applications that are run in different software containers).

The software 450 contains the parallel DTLS connection coordinator 112 that performs operations described herein above. The parallel DTLS connection coordinator 112 may be instantiated within the applications 464A-R. The instantiation of the one or more sets of one or more applications 464A-R, as well as virtualization if implemented, are collectively referred to as software instance(s) 452. Each set of applications 464A-R, corresponding virtualization construct (e.g., instance 462A-R) if implemented, and that part of the hardware 440 that executes them (be it hardware dedicated to that execution and/or time slices of hardware temporally shared), forms a separate virtual electronic device 460A-R.

A network interface (NI) may be physical or virtual. In the context of IP, an interface address is an IP address assigned to an NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address).

Terms

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

References in the specification to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The description and claims may use the terms "coupled" and "connected," along with their derivatives. These terms are not intended as synonyms for each other. "Coupled" is used to indicate that two or more elements, which may or may not be in direct physical or electrical contact with each other, co-operate or interact with each other. "Connected" is used to indicate the establishment of wireless or wireline communication between two or more elements that are coupled with each other. A "set," as used herein, refers to any positive whole number of items including one item.

An electronic device stores and transmits (internally and/or with other electronic devices over a network) code (which is composed of software instructions and which is sometimes referred to as a computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical, or other form of propagated signals-such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, or a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radio frequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate with wire through plugging in a cable to a physical port connected to an NIC. One or more parts of an embodiment of the invention may be implemented using different combinations of software, firmware, and/or hardware.

A network node (also referred as network device or simply node) is an electronic device that communicatively interconnects other electronic devices on the network (e.g., other network devices, end-user devices). Some network nodes are "multiple services network nodes" that provide support for multiple networking functions (e.g., routing, bridging, switching, Layer 2 aggregation, session border control, Quality of Service, and/or subscriber management), and/or provide support for multiple application services (e.g., data, voice, and video).

The terms "module," "logic," and "unit" used in the present application, may refer to a circuit for performing the function specified. In some embodiments, the function specified may be performed by a circuit in combination with software such as by software executed by a general purpose processor.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

What is claimed is:

1. A method at a first network node for encoding user messages for secure transmission to a second network node comprising:
   initiating a Datagram Transport Layer Security (DTLS) connection over a stream control transmission protocol (SCTP) association through a DTLS handshake using an existing Authenticated Chunks for SCTP (SCTP-AUTH) key from an existing DTLS connection over the SCTP association that transmits user messages from the first network node to the second network node;
   deriving a new SCTP-AUTH key from the initiated DTLS connection;
   transmitting further user messages through the initiated DTLS connection with the new SCTP-AUTH key; and
   closing the existing DTLS connection over the SCTP association upon confirmation that SCTP packets encrypted with the existing DTLS connection and SCTP packets authenticated by the existing SCTP-AUTH key have been delivered.

2. The method of claim 1, further comprising:
   transmitting ongoing SCTP packets containing a further part of the user messages secured by the initiated DTLS connection but authenticated with the existing SCTP-AUTH key.

3. The method of claim 1, wherein closing the existing DTLS connection over the SCTP association comprises sending a first DTLS connection close notification to the second network node.

4. The method of claim 3, wherein closing the existing DTLS connection over the SCTP association further comprises receiving a second DTLS connection close notification from the second network node.

5. The method of claim 3, wherein sending the first DTLS connection close notification comprises confirming transmitted data in the existing DTLS connection has been acknowledged by the second network node in a non-renegable way prior to sending the first DTLS connection close notification.

6. The method of claim 1, wherein the existing and new SCTP-AUTH keys are identified by corresponding existing and new key identifiers (IDs), wherein the new key identifier is a value increase by one from the existing key identifier.

7. The method of claim 1, wherein the DTLS connection is established prior to that one or more certificates of the existing DTLS connection over the SCTP association expire.

8. The method of claim 7, wherein initiating the DTLS connection over the SCTP association through the DTLS handshake comprises maintaining the one or more certificates of the existing DTLS connection including timestamps in the one or more certificates.

9. The method of claim 1, wherein performing the handshake between the first and second network nodes comprises:
   in response to initiating the handshake and receiving an initiation of the handshake, continuing the initiated handshake when the first network node is to serve as a DTLS client of the DTLS connection.

10. The method of claim 1, wherein the existing SCTP-AUTH key is removed upon closure of the existing DTLS connection.

11. A network node, comprising:
a processor and non-transitory machine-readable storage medium that provides instructions that, when executed by the processor, are capable of causing the processor to perform:
initiating a Datagram Transport Layer Security (DTLS) connection over a stream control transmission protocol (SCTP) association through a DTLS handshake using an existing Authenticated Chunks for SCTP (SCTP-AUTH) key from an existing DTLS connection over the SCTP association that transmits user messages to another network node;
deriving a new SCTP-AUTH key from the initiated DTLS connection;
transmitting further user messages through the initiated DTLS connection with the new SCTP-AUTH key; and
closing the existing DTLS connection over the SCTP association upon confirmation that SCTP packets encrypted with the existing DTLS connection and SCTP packets authenticated by the existing SCTP-AUTH key have been delivered.

12. The network node of claim 11, wherein the non-transitory machine-readable storage medium provides instructions that, when executed by the processor, are capable of causing the processor to further perform:
transmitting ongoing SCTP packets containing a further part of the user messages secured by the initiated DTLS connection but authenticated with the existing SCTP-AUTH key.

13. The network node of claim 11, wherein closing the existing DTLS connection over the SCTP association comprises sending a first DTLS connection close notification to the another network node.

14. The network node of claim 11, wherein the existing and new SCTP-AUTH keys are identified by corresponding existing and new key identifiers (IDs), wherein the new key identifier is a value increase by one from the existing key identifier.

15. The network node of claim 11, wherein the DTLS connection is established prior to that one or more certificates of the existing DTLS connection over the SCTP association expire.

16. The network node of claim 11, wherein performing the handshake between the network node and the another network nodes comprises, in response to initiating the handshake and receiving an initiation of the handshake, continuing the initiated handshake when the network node is to serve as a DTLS client of the DTLS connection.

17. The network node of claim 11, wherein the existing SCTP-AUTH key is removed upon closure of the existing DTLS connection.

18. A non-transitory machine-readable storage medium that provides instructions that, when executed by a processor, are capable of causing the processor to perform:
initiating a Datagram Transport Layer Security (DTLS) connection over a stream control transmission protocol (SCTP) association through a DTLS handshake using an existing Authenticated Chunks for SCTP (SCTP-AUTH) key from an existing DTLS connection over the SCTP association that transmits user messages from a first network node to a second network node;
deriving a new SCTP-AUTH key from the initiated DTLS connection;
transmitting further user messages through the initiated DTLS connection with the new SCTP-AUTH key; and
closing the existing DTLS connection over the SCTP association upon confirmation that SCTP packets encrypted with the existing DTLS connection and SCTP packets authenticated by the existing SCTP-AUTH key have been delivered.

19. The non-transitory machine-readable storage medium of claim 18, wherein the provided instructions when executed by a processor, are capable of causing the processor to further perform:
transmitting ongoing SCTP packets containing a further part of the user messages secured by the initiated DTLS connection but authenticated with the existing SCTP-AUTH key.

20. The non-transitory machine-readable storage medium of claim 18, wherein closing the existing DTLS connection over the SCTP association comprises sending a first DTLS connection close notification to the second network node.

* * * * *